(12) United States Patent
Lu et al.

(10) Patent No.: US 12,325,491 B2
(45) Date of Patent: Jun. 10, 2025

(54) HUB MOTOR FOR PEDELEC

(71) Applicant: TIEN HSIN INDUSTRIES CO., LTD., Taichung (TW)

(72) Inventors: Chien-Mo Lu, Taichung (TW); Yu-Chen Wu, Taichung (TW); Chin-Wen Ou, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 357 days.

(21) Appl. No.: 18/113,039

(22) Filed: Feb. 22, 2023

(65) Prior Publication Data

US 2023/0278665 A1 Sep. 7, 2023

(30) Foreign Application Priority Data

Mar. 4, 2022 (TW) ................................. 111202196

(51) Int. Cl.
| | |
|---|---|
| *B62M 6/65* | (2010.01) |
| *H02K 1/27* | (2022.01) |
| *H02K 7/00* | (2006.01) |

(52) U.S. Cl.
CPC ................ *B62M 6/65* (2013.01); *H02K 1/27* (2013.01); *H02K 7/003* (2013.01); *H02K 7/006* (2013.01)

(58) Field of Classification Search
CPC ........... B62M 6/65; H02K 1/27; H02K 7/003; H02K 7/006; B60K 7/00; B60K 7/0007; B60K 2007/0092
See application file for complete search history.

(56) References Cited

U.S. PATENT DOCUMENTS

| | | | | |
|---|---|---|---|---|
| 6,278,216 | B1 * | 8/2001 | Li ............................ | B60L 50/20 |
| | | | | 310/67 A |
| 8,338,999 | B2 * | 12/2012 | Takeuchi ................. | H02K 7/14 |
| | | | | 310/67 R |
| 12,115,859 | B2 * | 10/2024 | Yang ....................... | H02K 7/116 |
| 2023/0182859 | A1 * | 6/2023 | Huang ..................... | H02K 3/26 |
| | | | | 301/6.5 |

FOREIGN PATENT DOCUMENTS

| | | | |
|---|---|---|---|
| CN | 211664486 U | * 10/2020 | |
| CN | 111969766 A | * 11/2020 | ......... H02K 11/0094 |

* cited by examiner

*Primary Examiner* — John D Walters
(74) *Attorney, Agent, or Firm* — Apex Juris, pllc; R. Lynette Wylie (57) ABSTRACT

A hub motor for a pedelec includes a hub housing, a shaft module, a stator unit including a control circuit board, a rotor unit, a freehub module, and a signal wire. The shaft module includes a shaft tube and a casing tube fitting around the shaft tube. The shaft tube has an inner circumference and an outer circumference, which are opposite, the inner circumference encircles to form a perforation. A groove is formed by recessing into the outer circumference. The casing tube fits around the shaft tube to cover the groove, thereby forming a wiring space. The freehub module includes a freehub body for sensing a rotational speed of the hub housing and an output portion electrically connected to the freehub body. The signal wire passes and is restricted in the wiring space, which prevents the signal wire from being torn. An end of the signal wire is electrically connected to the output portion, and the other end is electrically connected to the control circuit board.

11 Claims, 7 Drawing Sheets

HUB MOTOR FOR PEDELEC

BACKGROUND OF THE INVENTION

Technical Field

The present disclosure relates generally to a motor for an electric bicycle, and more particularly to a hub motor for a pedelec.

Description of Related Art

So far, a conventional hub motor for a pedelec includes a hub housing, a middle shaft, a control circuit board, a stator unit, a rotor unit, a reduction gear set, and a receiving circuit board. The middle shaft passes through the hub housing in an axial direction of the hub housing. The control circuit board is located in the hub housing. The stator unit is located in the hub housing and is electrically connected to the control circuit board. The rotor unit surrounds the stator unit. The reduction gear set is fixed to the rotor unit, the rotor is driven by the reduction gear set to rotate and to drive the hub housing to rotate. The control circuit board is electrically connected to the receiving circuit board via a signal wire. Two ends of the middle shaft are exposed out of the hub housing and could be respectively connected to the two front forks. The signal wire extends along the axial direction and passes through the reduction gear set. The control circuit board controls the stator unit to generate a magnetic force to rotate the rotor unit, and the rotor unit drives the reduction gear set and the hub housing to rotate.

However, since the signal wire extends and passes through the reduction gear set along the axial direction, the signal wire is easy to be torn and damaged by the reduction gear set. Thus, the conventional hub motor of the pedelec has room for improvement.

BRIEF SUMMARY OF THE INVENTION

In view of the above, the primary objective of the present disclosure is to provide a hub motor for overcoming the abovementioned defects.

The present disclosure provides a hub motor for a pedelec, which is used in a quick-release shaft, including a hub housing, a shaft module, a stator unit, a rotor unit, a reduction gear set, a freehub module, and a signal wire. The shaft module includes a shaft tube and a casing tube that fits around the shaft tube, wherein the shaft tube is hollow and passes through the hub housing in an axial direction of the hub motor. The shaft tube forms a perforation that is adapted to be inserted by the quick-release shaft. The shaft tube includes an inner circumference, an outer circumference, and a groove, wherein the inner circumference encircles to form the perforation, and the outer circumference is opposite to the inner circumference. The groove is formed by recessing into the outer circumference in a direction from the outer circumference into the inner circumference, wherein the groove extends along the axial direction. The casing tube fits around the shaft tube to cover the groove to form a wiring space. The stator unit includes a stator bracket, a plurality of stators, and a control circuit board, wherein the stator bracket is fixed to and surround the shaft tube, and the plurality of stators is disposed on the stator bracket and is arranged to surround the shaft tube. The control circuit board is disposed on the stator bracket and is electrically connected to the stators. The rotor unit rotatably disposed around the stator unit and the shaft tube and includes a rotor bracket and a plurality of rotors, wherein the rotor bracket rotatably fits around the shaft tube, and the rotors are disposed in the rotor bracket and surround the stators. The reduction gear set is located in the hub housing and is spaced apart from the stator unit and the rotor unit in the axial direction, wherein the reduction gear set surrounds the wiring space. The reduction gear set is driven by the rotor unit to drive the hub housing to rotate relative to the shaft module. The freehub module is spaced from the stator unit, the rotor unit, and the reduction gear set in the axial direction and is pivotally connected to the hub housing. The freehub module includes a freehub body and an output portion, wherein the freehub body is adapted to restrict a rotational direction of the hub housing to a single direction and to sense a rotational speed of the hub housing. The output portion is electrically connected to the freehub body for outputting the rotational speed of the hub housing, wherein the output portion is adjacent to the groove. A signal wire passes through and is restricted in the wiring space, wherein the signal wire is spaced apart from the reduction gear set. An end of the signal wire is electrically connected to the output portion of the freehub module, and another end of the signal wire is electrically connected to the control circuit board.

With such design, the groove on the shaft tube could be covered by the casing tube that fits around the shaft tube to form the wiring space. The wiring space could provide the signal wire to pass through and isolate the signal wire from the reduction gear set. Therefore, when the reduction gear set, the rotor unit, and the hub housing are rotated, a section of the signal wire that is restricted in the wiring space will not be torn, which effectively solves the problem that the signal wire is easy to be torn, thereby enhancing the durability of the hub motor.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

It should be appreciated that relative positional terms used herein are merely for ease of description and refer to the orientation of the components as shown in the figures. It should be understood that any orientation of the components described herein is within the scope of the present disclosure.

Figure 1:
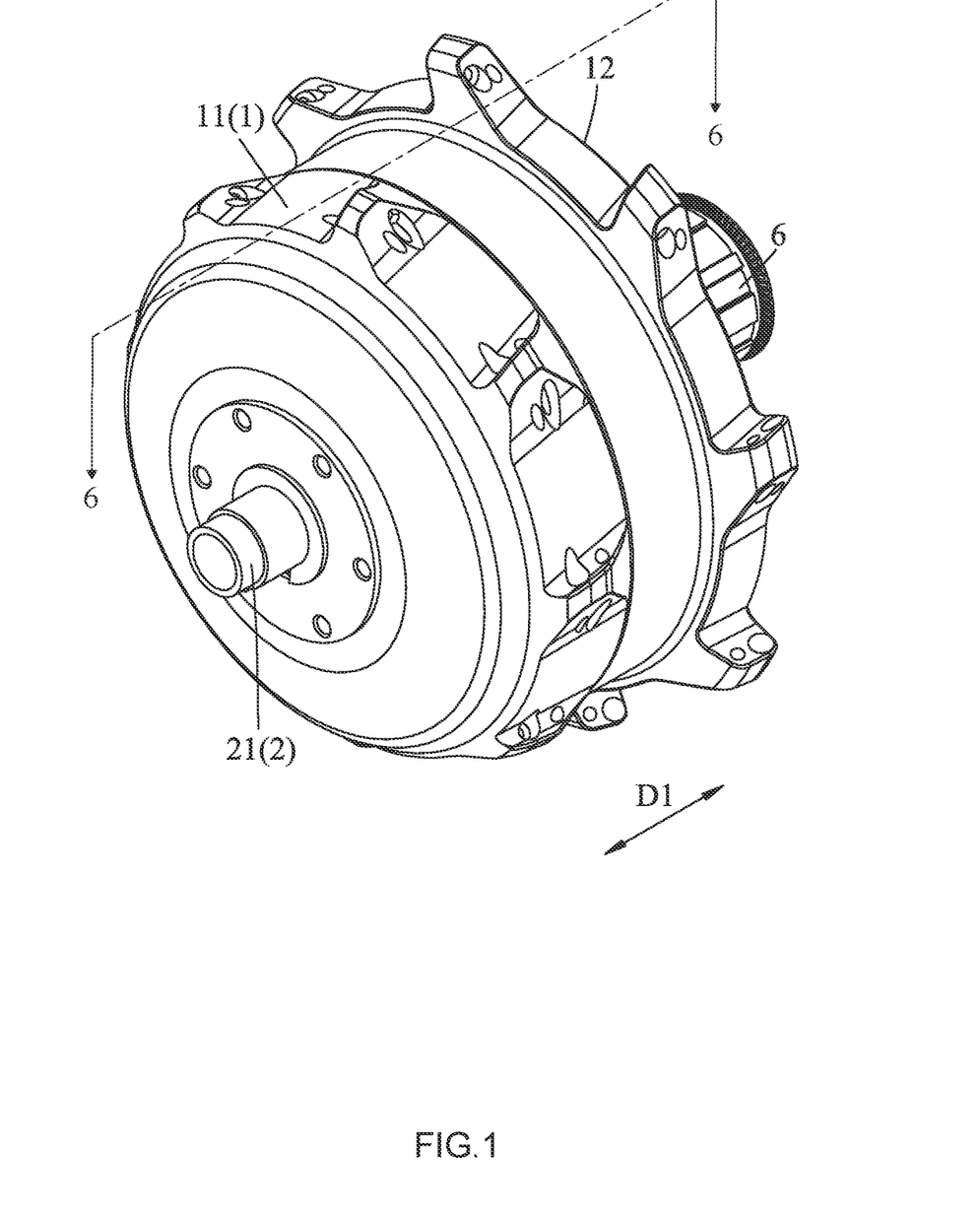
FIG. 1 is a perspective view of the hub motor of the pedelec of an embodiment according to the present disclosure.
Figure 2:
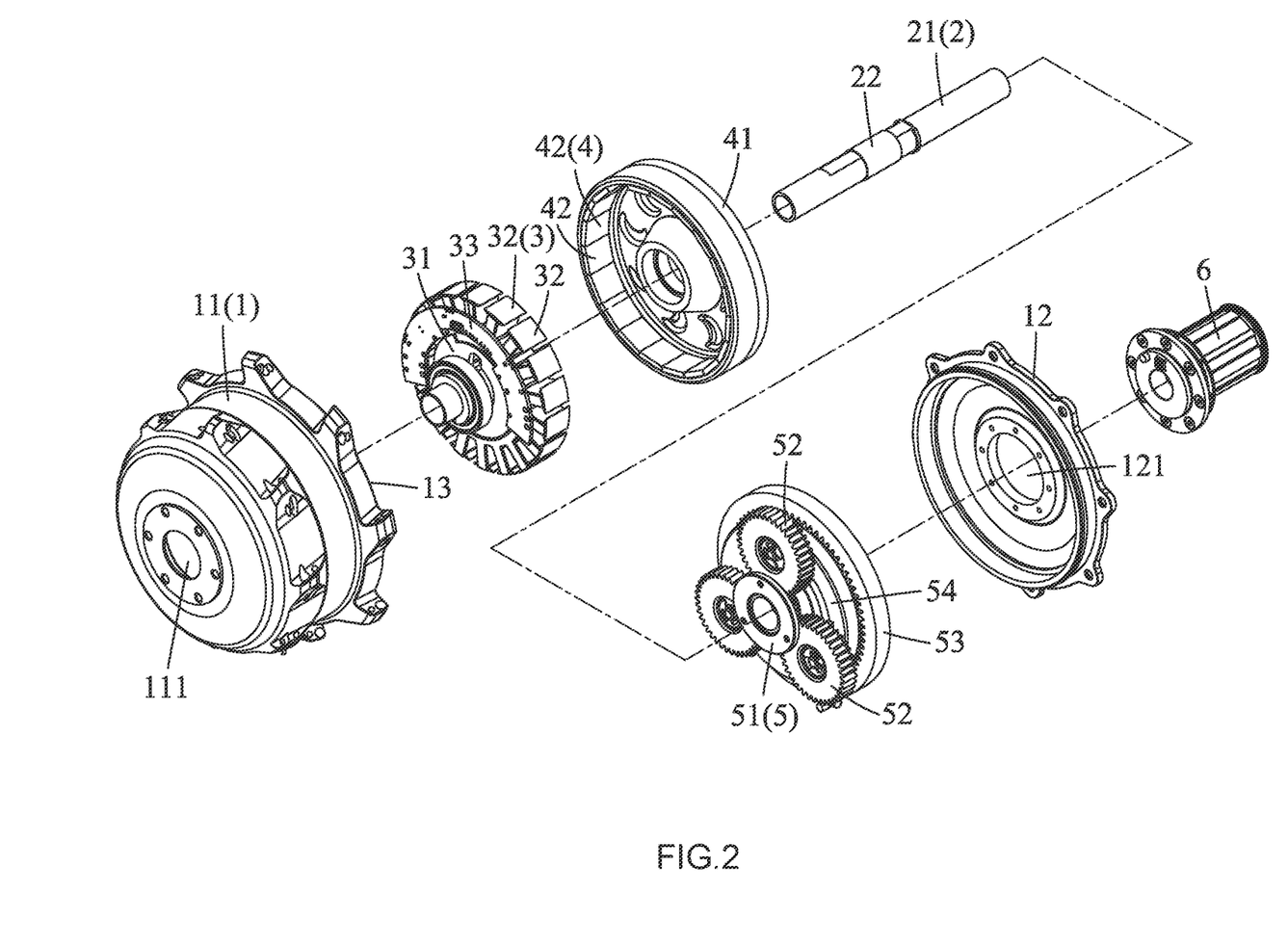
FIG. 2 is an exploded view of the hub motor of the pedelec shown in FIG. 1.
Figure 3:
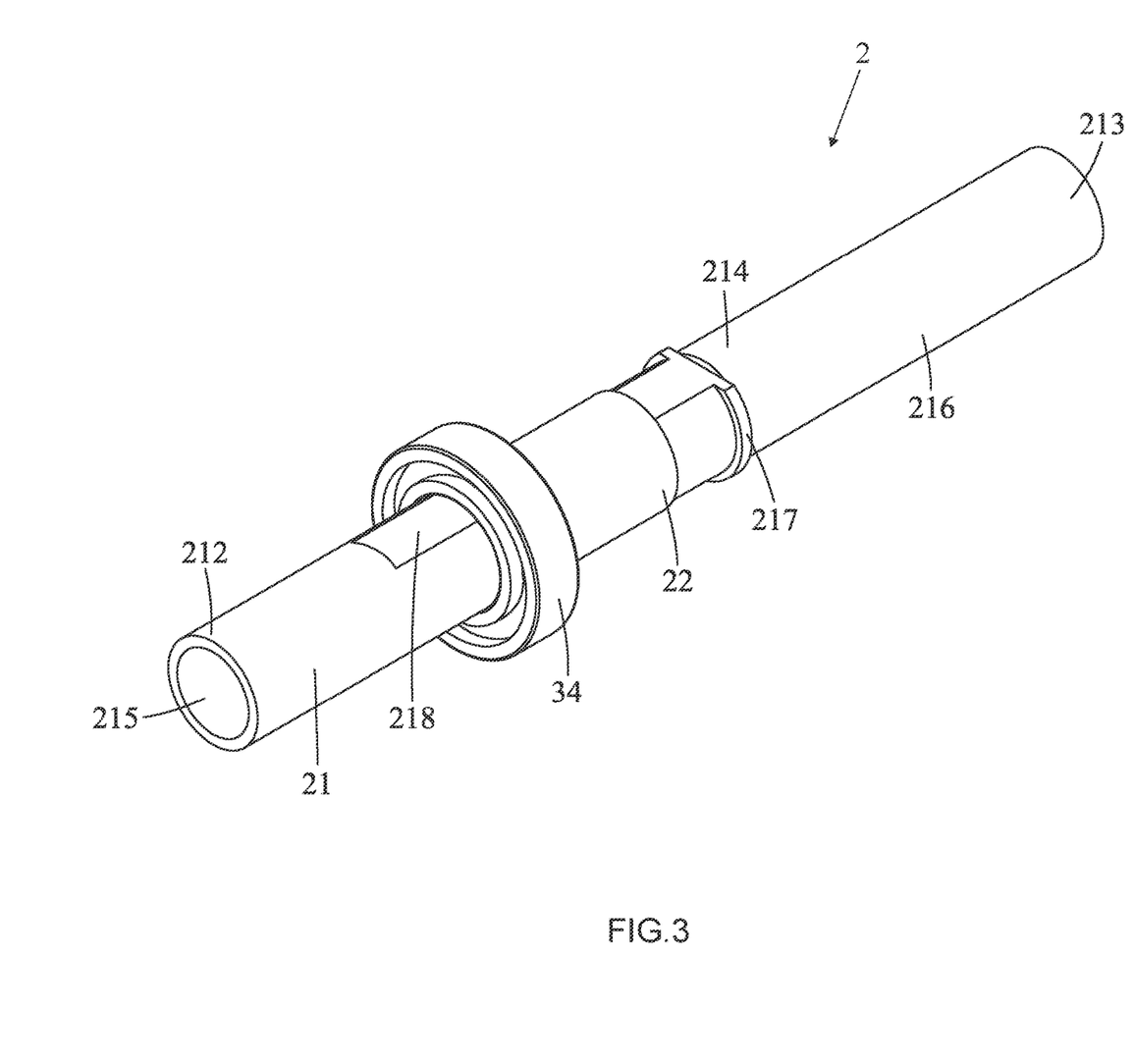
FIG. 3 is a perspective view of the shaft tube, the casing tube, and the roller bearing of the embodiment that are assembled.
Figure 4:
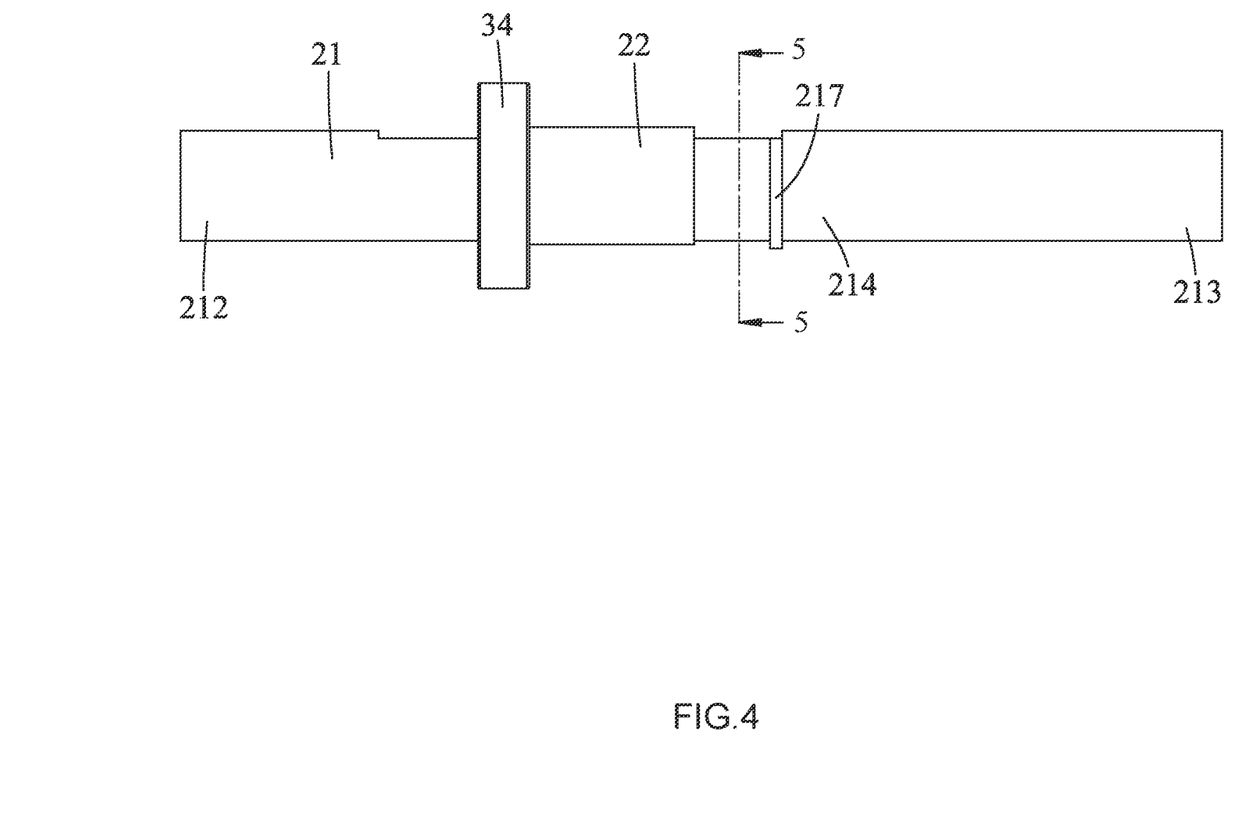
FIG. 4 is a side view of the structure shown in FIG. 3.
Figure 5:
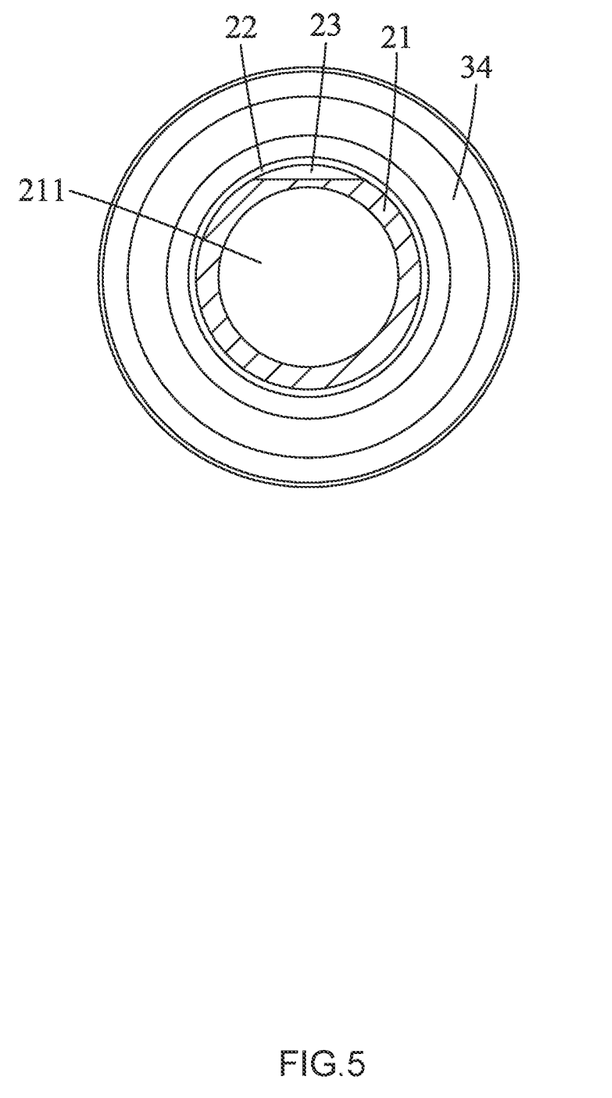
FIG. 5 is a sectional view taken along the 5-5 line in FIG. 4.

As illustrated in FIG. 1 and FIG. 2, a hub motor of an embodiment according to the present disclosure for a pedelec is adapted to be inserted by a quick-release shaft, and an axial direction D1 is defined to be parallel to an axle of the hub motor.

In the current embodiment, the hub motor includes a hub housing 1, a shaft module 2, a stator unit 3, a rotor unit 4, a reduction gear set 5, a freehub module 6, and a signal wire 7, which will be described more detail in the following.

The hub housing 1 includes a main housing 11 and a cover 12 that could be correspondingly secured to the main housing 11, wherein the main housing 11 has a first opening 111, and the cover 12 has a second opening 121. The shaft module 2 passes through the first opening 111 and the second opening 121. The main housing 11 forms a receiving space 13 for receiving the stator unit 3, the rotor unit 4, the reduction gear set 5, and the signal wire 7.

As illustrated in FIG. 2 to FIG. 5, the shaft module 2 includes a shaft tube 21 and a casing tube 22 that fits around the shaft tube 21, wherein the shaft tube 21 of the shaft module 2 is hollow and passes through the hub housing 1 in the axial direction D1. The shaft tube 21 provides a perforation 211 for being inserted by the quick-release shaft. The shaft tube 21 includes a first end portion 212, a second end portion 213, a middle portion 214, an inner circumference 215, an outer circumference 216, a blocking portion 217, and a groove 218. The first end portion 212 and the second end portion 213 are opposite to each other, and the middle portion is connected between the first end portion 212 and the second end portion 213. The first end portion 212 passes through the first opening 111, and the second end portion 213 passes through the second opening 121 to be connected to the freehub module 6. The inner circumference 215 of the shaft tube 21 encircles to form the perforation 211. The outer circumference 216 is opposite to the inner circumference 215 and is disposed with the blocking portion 217 that extends outwardly from the outer circumference 216. The groove 218 is located at the middle portion 214 which is formed by recessing into the outer circumference 216 in a direction from the outer circumference 216 into the inner circumference 215. The groove 218 extends along the axial direction D1, and a width of the groove 218 in the axial direction D1 is greater than a width of the casing tube 22 in the axial direction D1. The casing tube 22 fits around the shaft tube 21 to cover the groove 218 to form a wiring space 23. In the current embodiment, the casing tube 22 is made of stainless steel.

Figure 6:
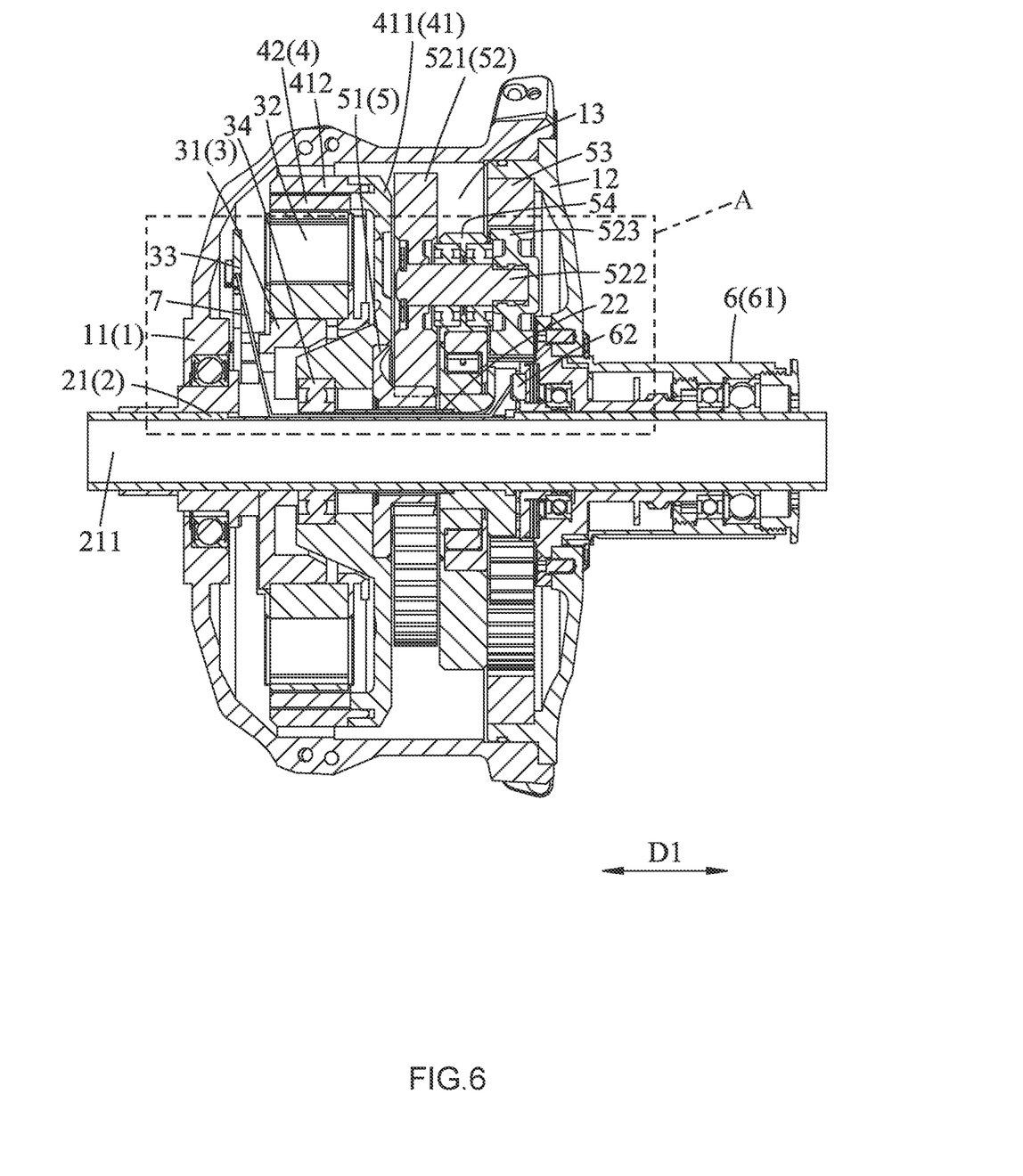
FIG. 6 is a sectional view taken along the 6-6 line in FIG. 1.
Figure 7:
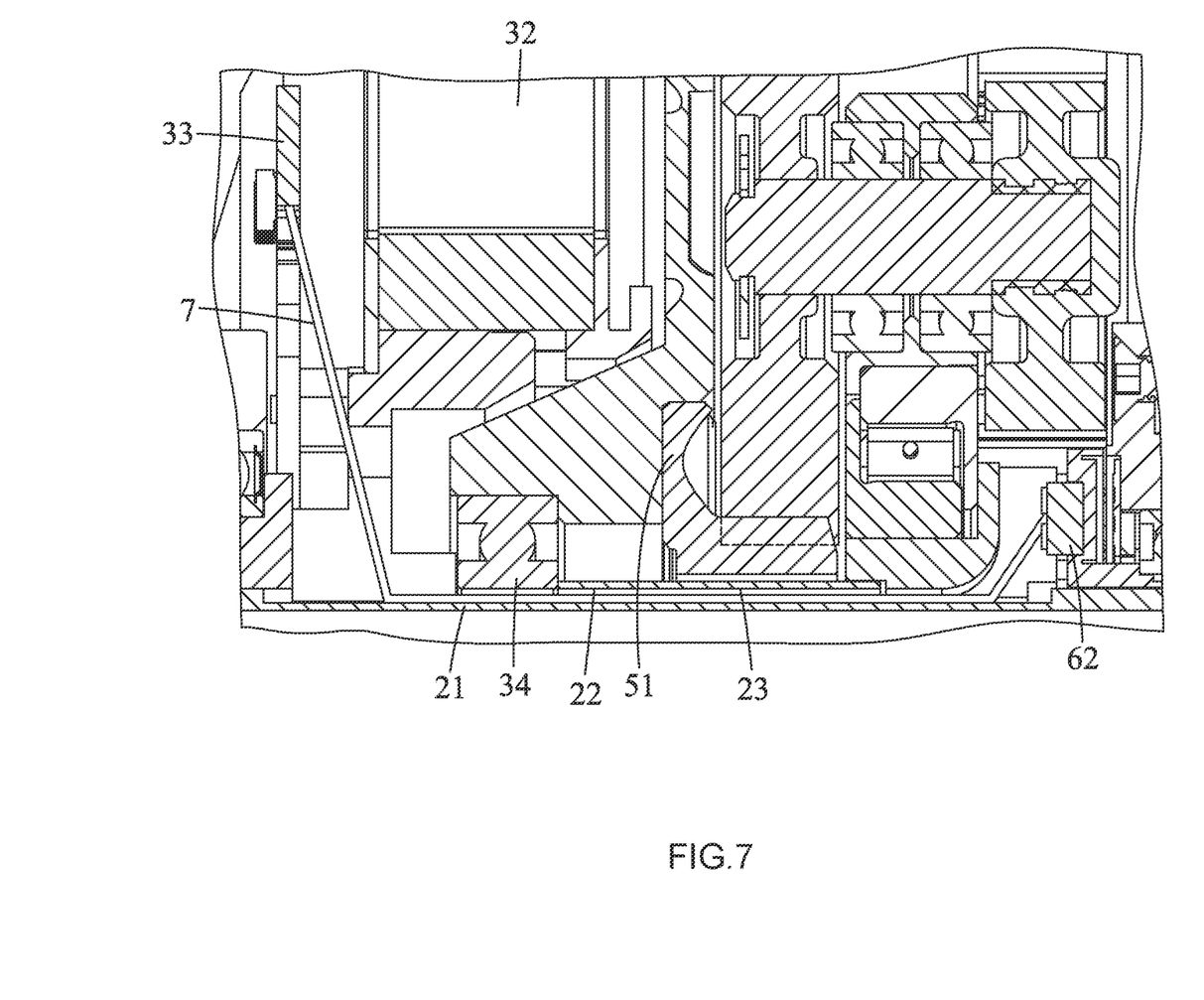
FIG. 7 is a partially enlarged view of the marked portion A in FIG. 6.

As illustrated in FIG. 2, FIG. 6, and FIG. 7, the stator unit 3 includes a stator bracket 31, a plurality of stators 32, a control circuit board 33, and a roller bearing 34, wherein the stator bracket 31 is fixed to and surround the shaft tube 21, and the plurality of stators 32 is disposed on the stator bracket 31 and are arranged to surround the shaft tube 21. The control circuit board 33 is disposed on the stator bracket 31 and is electrically connected to the stators 32. The roller bearing 34 fixedly fit around the shaft tube 21 to cover the groove 218 on the shaft tube 21. In the current embodiment, the stators 32 are coils.

The rotor unit 4 is rotatably disposed around the stator unit 3 and the shaft tube 21. The rotor unit 4 includes a rotor bracket 41 and a plurality of rotors 42, wherein the rotor bracket 41 rotatably fits around the shaft tube 21, and the rotors 42 are disposed in the rotor bracket 41 and surround the stators 32. In the current embodiment, the rotor bracket 41 has a main body seat 411 and a plurality of extending portions 412, wherein the main body seat 411 is spaced apart from the stator unit 3 in the axial direction D1. Each of the extending portions 412 extends toward one of the stators 32 and surrounds the stators 32. Each of the extending portions 412 is disposed with one of the rotors 42, wherein a number of the extending portions 412 is equal to a number of the rotors 42. The main body seat 411 of the rotor bracket 41 rotatably fits around the roller bearing 34 and the shaft tube 21, wherein the roller bearing 34 and the casing tube 22 jointly fits around the shaft tube 21 to cover the groove 218, thereby forming the wiring space 23. In the current embodiment, the rotors 42 are permanent magnets.

The reduction gear set 5 is located in the hub housing 1 and is spaced apart from the stator unit 3 and the rotor unit 4 in the axial direction D1. The reduction gear set 5 surrounds the wiring space 23 and includes a sun gear 51, three planetary gears 52, an internal gear ring 53, and a gear rack 54. The sun gear 51 is fixed to the rotor bracket 41 and is driven by the rotor unit 4, and the three planetary gears 52 surround the sun gear 51 and are meshed with the sun gear 51. The internal gear ring 53 is fixed to an internal side of the hub housing 1, and the three planetary gears 52 are meshed with the internal gear ring 53. The planetary gears 52 are pivotably connected to the gear rack 54, wherein each of the planetary gears 52 has a first sub gear 521, a linkage rod 522, and a second sub gear 523. The first sub gear 521 of each of the planetary gears 52 is meshed with the sun gear 51. The linkage rod 522 of each of the planetary gears 52 is fixed to the first sub gear 521 and is pivotally connected to the gear rack 54. The second sub gear 523 of each of the planetary gears 52 is fixed to the linkage rod 522 and is meshed with the internal gear ring 53.

It is worth to mention that a linkage between the rotor unit 4 and the reduction gear set 5 is not limited to the abovementioned. In other embodiments, the rotor unit 4 could be connected to the gear rack 54, and the gear rack 54 drives the sun gear 51 to move, wherein the sun gear 51 is meshed with the planetary gears 52, and the planetary gears 52 are meshed with the internal gear ring 53. In other words, the linkage between the rotor unit 4 and the reduction gear set 5 could be adjusted on the required demand and is not limited to the abovementioned.

In the current embodiment, the cover 12 is fixed to the internal gear ring 53 of the reduction gear set 5, so that the reduction gear set 5 could drive the cover 12 to rotate, thereby driving the main housing 11 to rotate.

Additionally, in other embodiments, the main housing 11 is fixed to the internal gear ring 53 of the reduction gear set 5, so that the reduction gear set 5 directly drives the main housing 11 to rotate.

The freehub module 6 is spaced from the stator unit 3, the rotor unit 4, and the reduction gear set 5 in the axial direction D1 and is pivotally connected to the hub housing 1. The freehub module 6 includes a freehub body 61 and an output portion 62. The freehub body 61 is adapted to restrict the rotation of the hub housing 1 and to sense a rotational speed of the hub housing 1. Since the rotation of the hub housing 1 is restricted, the hub housing could merely be rotated in a single direction. The output portion 62 is electrically connected to the freehub body 61 and is adapted to output the rotational speed of the hub housing 1, wherein the output portion 62 is adjacent to the groove 218. In the current embodiment, the output portion 62 is an electrical contact. It is worth to mention that the freehub body 61 could sense the rotational speed by a built-in hall effect sensor to sense the rotational speed, which is a well-known skill, thus the relative details are not described herein.

The signal wire 7 passes through and is restricted in the wiring space 23, so that the signal wire 7 is spaced apart from the reduction gear set 5. An end of the signal wire 7 is electrically connected to the output portion 62 of the freehub module 6, and another end of the signal wire 7 is electrically connected to the control circuit board 33.

When the hub motor for the pedelec of the current embodiment is actuated, the control circuit board 33 drives the stators 32 to generate magnetic force, so that the rotor bracket 41 is driven to rotate relative to the shaft tube 21 and the casing tube 22, thereby driving the sun gear 51 to rotate simultaneously. When the sun gear 51 is rotated, the power is sequentially transmitted through the sun gear 51 and the planetary gears 52 to the internal gear ring 53, so that the internal gear ring 53 drives the hub housing 1 to rotate simultaneously, thereby driving the pedelec.

Since the shaft tube 21 and the casing tube 22 are not rotated as the rotor bracket 41 is rotated, the wiring space 23 remains at the original position. The signal wire 7 that is located and restricted in the wiring space 23 could not only be apart from the reduction gear set 5, but also avoid being torn to damage. With such design, the problem that the signal wire 7 is torn by the reduction gear set 5 could be prevented.

In conclusion, when the reduction gear set 5, the rotor unit 4, and the hub housing 1 are rotated, the signal wire 7 that is restricted in the wiring space 23 will not be torn, so that a problem that the signal wire 7 is torn to damage could be solved, thereby enhancing the durability of the signal wire 7.

It must be pointed out that the embodiment described above is only a preferred embodiment of the present disclosure. All equivalent structures which employ the concepts disclosed in this specification and the appended claims should fall within the scope of the present disclosure.

What is claimed is:

1. A hub motor for a pedelec, which is used in a quick-release shaft, comprising:
    a hub housing;
    a shaft module comprising a shaft tube and a casing tube that fits around the shaft tube, wherein the shaft tube is hollow and passes through the hub housing in an axial direction of the hub motor; the shaft tube forms a perforation that is adapted to be inserted by the quick-release shaft; the shaft tube comprises an inner circumference, an outer circumference, and a groove, wherein the inner circumference encircles to form the perforation, and the outer circumference is opposite to the inner circumference; the groove is formed by recessing into the outer circumference in a direction from the outer circumference into the inner circumference and extends along the axial direction; the casing tube fits around the shaft tube to cover the groove to form a wiring space;
    a stator unit comprising a stator bracket, a plurality of stators, and a control circuit board, wherein the stator bracket is fixed to and surround the shaft tube, and the plurality of stators is disposed on the stator bracket and is arranged to surround the shaft tube; the control circuit board is disposed on the stator bracket and is electrically connected to the stators;
    a rotor unit rotatably disposed around the stator unit and the shaft tube and comprising a rotor bracket and a plurality of rotors, wherein the rotor bracket rotatably fits around the shaft tube, and the rotors are disposed in the rotor bracket and surround the stators;
    a reduction gear set located in the hub housing and spaced apart from the stator unit and the rotor unit in the axial direction, wherein the reduction gear set surrounds the wiring space; the reduction gear set is driven by the rotor unit to drive the hub housing to rotate relative to the shaft module;
    a freehub module spaced from the stator unit, the rotor unit, and the reduction gear set in the axial direction and pivotally connected to the hub housing; the freehub module comprises a freehub body and an output portion, wherein the freehub body is adapted to restrict a rotational direction of the hub housing to a single direction and to sense a rotational speed of the hub housing; the output portion is electrically connected to the freehub body for outputting the rotational speed of the hub housing, wherein the output portion is adjacent to the groove; and
    a signal wire passing through and restricted in the wiring space, wherein the signal wire is spaced apart from the reduction gear set; an end of the signal wire is electrically connected to the output portion of the freehub module, and another end of the signal wire is electrically connected to the control circuit board.

2. The hub motor as claimed in claim 1, wherein the stator unit further comprises a roller bearing, wherein the roller bearing fixedly fits around the shaft tube to cover the groove; the rotor bracket fits around the roller bearing, so that the rotor bracket rotatably fits around the shaft tube; the roller bearing and the casing tube jointly fit around the shaft tube to cover the groove, thereby forming the wiring space.

3. The hub motor as claimed in claim 2, wherein the hub housing comprises a main housing and a cover that is correspondingly secured to the main housing, wherein the main housing has a first opening, and the cover has a second opening; the shaft tube passes through the first opening and the second opening; the main housing forms a receiving space for receiving the stator unit, the rotor unit, the reduction gear set, and the signal wire; the main housing is fixed to the internal gear ring of the reduction gear set, so that the main housing is driven by the reduction gear set to rotate.

4. The hub motor as claimed in claim 3, wherein the shaft tube comprises a first end portion, a second end portion, and a middle portion; the first end portion and the second end portion are opposite to each other, and the middle portion is connected between the first end portion and the second end portion; the first end portion passes through the first opening, and the second end portion passes through the second opening to be connected to the freehub module; the groove is located at the middle portion of the shaft tube.

5. The hub motor as claimed in claim 2, wherein the hub housing comprises a main housing and a cover that is correspondingly secured to the main housing, wherein the main housing has a first opening, and the cover has a second opening; the shaft tube passes through the first opening and the second opening; the main housing forms a receiving space for receiving the stator unit, the rotor unit, the reduction gear set, and the signal wire; the cover is fixed to the internal gear ring of the reduction gear set, so that the cover is driven by the reduction gear set to rotate, and the main housing is driven by the cover to rotate simultaneously.

6. The hub motor as claimed in claim 5, wherein the shaft tube comprises a first end portion, a second end portion, and a middle portion; the first end portion and the second end portion are opposite to each other, and the middle portion is connected between the first end portion and the second end portion; the first end portion passes through the first opening, and the second end portion passes through the second opening to be connected to the freehub module; the groove is located at the middle portion of the shaft tube.

7. The hub motor as claimed in claim 1, wherein the reduction gear set comprises a sun gear, a plurality of planetary gears, an internal gear ring, and a gear rack; the sun gear is driven by the rotor unit, and the plurality of planetary gears surrounds the sun gear and are meshed with the sun gear, the internal gear ring is fixed to an internal side of the hub housing; the plurality of planetary gears is meshed with the internal gear ring; the plurality of planetary gears is pivotably connected to the gear rack; when the rotor unit sequentially drives the sun gear, the plurality of planetary gears, and the internal gear ring to rotate, the hub housing is driven to rotate relative to the shaft module.

8. The hub motor as claimed in claim 1, wherein a width of the groove in the axial direction is greater than a width of the casing tube in the axial direction.

9. The hub motor as claimed in claim 1, wherein the plurality of stators is coils.

10. The hub motor as claimed in claim 1, wherein the plurality of rotors is permanent magnets.

11. The hub motor as claimed in claim 1, wherein the casing tube is made of stainless steel.

\* \* \* \* \*